United States Patent [19]

Alexander

[11] Patent Number: 5,896,131
[45] Date of Patent: Apr. 20, 1999

[54] VIDEO RASTER DISPLAY WITH FOREGROUND WINDOWS THAT ARE PARTIALLY TRANSPARENT OR TRANSLUCENT

[75] Inventor: Jay A Alexander, Monument, Colo.

[73] Assignee: Hewlett-Packard Company, Palo Alto, Calif.

[21] Appl. No.: 08/846,984

[22] Filed: Apr. 30, 1997

[51] Int. Cl.$^6$ .................................. G06F 3/14; G06T 5/50
[52] U.S. Cl. ...................... 345/340; 345/344; 345/435; 345/521; 345/440; 345/134
[58] Field of Search ................................. 345/344, 435, 345/340, 521, 440, 523, 186, 191, 134

[56] References Cited

U.S. PATENT DOCUMENTS

| | | | |
|---|---|---|---|
| 4,039,784 | 8/1977 | Quarton et al. | 345/440 |
| 4,771,275 | 9/1988 | Sanders | 345/186 |
| 4,992,781 | 2/1991 | Iwasaki et al. | 340/747 |
| 5,237,417 | 8/1993 | Hayashi et al. | 358/183 |
| 5,265,202 | 11/1993 | Krueger et al. | 395/158 |
| 5,434,626 | 7/1995 | Hayashi et al. | 348/569 |
| 5,440,680 | 8/1995 | Ichikawa et al. | 345/344 |
| 5,463,728 | 10/1995 | Blahut et al. | 345/344 |
| 5,604,544 | 2/1997 | Bertram | 348/601 |
| 5,625,764 | 4/1997 | Tsujimoto et al. | 345/435 |
| 5,651,107 | 7/1997 | Frank et al. | 345/344 |

OTHER PUBLICATIONS

New Spicenet Version Allows Interactive Schematic Entry for Spice, Analog Ckt Simulation by Intusoft Inc., Apr. 27, 1989.

*Primary Examiner*—Raymond J. Bayerl
*Assistant Examiner*—Cuong T. Thai
*Attorney, Agent, or Firm*—Augustus W. Winfield

[57] ABSTRACT

A graphical display system in which a background graphical image is at least partially visible within a foreground window. Examples of foreground windows include pull-down menus or pop-up dialog boxes. In a specific example embodiment, the background image is digitized waveform data for a digital oscilloscope, and the foreground window is an interactive dialog box for control. Digitized waveforms are at least partially visible in parts of the dialog box. The system has separate memories for the dialog box and the waveform data. A dual-path video controller chip can switch between the two memories for any pixel. The video chip is programmed to switch when the data from the dialog box memory is a particular programmed color. For translucent areas, a checkerboard pattern is defined in the dialog box memory in which alternate pixels in the dialog box memory are the programmed color. As a result, in the translucent areas, digitized waveforms are displayed in half the pixels in a checkerboard pattern. For transparent areas, the pixels in the dialog box memory are the programmed color so that only the waveform data is displayed.

7 Claims, 6 Drawing Sheets

5,896,131

VIDEO RASTER DISPLAY WITH FOREGROUND WINDOWS THAT ARE PARTIALLY TRANSPARENT OR TRANSLUCENT

FIELD OF INVENTION

This invention relates generally to electronic raster displays such as computer displays and other electronic imaging displays.

BACKGROUND OF THE INVENTION

In electronic imaging displays, pull down menus, dialog boxes, and other interactive controls typically obscure underlying information. For example, in a personal computer operating system using software controlled display windows, a pull-down menu or "pop-up" dialog box is typically "opaque", completely blocking any underlying information. However, in many cases, it is useful to be able to see underlying information. In particular, if a selection on a menu or dialog box changes what is being displayed in the underlying image, it is useful to see that change before closing the menu or dialog box. For example, in many interactive control situations such as process control, instrument control, and cockpit displays, there may be a need to see the result of a selection before committing to a particular selection. There is a need for superimposed or foreground windows for which some of the foreground information is transparent or translucent, permitting some useful visibility of any underlying information.

A translucent television video image has been implemented as an overlay on a data processing video image. For example, see U.S. Pat. No. 5,265,202 (Krueger et al). In Krueger et al, within a television video window on a data processing display, selected lines of the video image are omitted and the corresponding data processing lines are visible. Within the television video window, both the video and data processing images are partially visible. In Krueger et al, the television image is written into a shared display memory synchronized with video framing and retrieved from memory synchronized with the display screen. Computer generated menus have been implemented as an overlay on television displays. For example, see U.S. Pat. No. 5,604,544 (Bertram). In Bertram, individual menu items are opaque, with a television image visible between the individual menu items. For instrument and control displays, a menu may have relatively small text or icons that need to be read by a human operator. Generally, detailed information may be more readable on opaque menu buttons, as in Bertram, than for overlay images where the entire overlay image is translucent as in Krueger et al.

Both Bertram and Krueger et al require compatibility with television video timing. In each, the ultimate result is that a computer generated image is being merged with a television image. In a computer or instrument, where both images are computer generated or where both images are in digital form in display memory, there are opportunities for less complex and lower cost implementations since display timing is of less concern. Instruments have timing concerns, but instrument timing concerns are dominated by timing of events being measured or controlled, not the timing of the particular display technology. It is possible, of course, in a computer or instrument to implement translucent or transparent windows entirely in software. However, in many instrument systems and control systems, a pure software system is too slow to process real-time events that must be displayed. There is a need for systems with software control over static or infrequently changing parts of a display and hardware control over rapidly changing parts of the display, with at least partial visibility of the rapidly changing parts at all times.

SUMMARY OF THE INVENTION

A display system is disclosed in which foreground windows can be partially transparent or translucent. As a specific example embodiment, an electronic instrument (digital oscilloscope) is disclosed in which dialog control boxes permit partial visibility of an underlying waveform display. For instruments, it is particularly useful to immediately see the result of control selections that affect how results are displayed. In the specific example of oscilloscopes, waveforms are partially visible between the controls within a dialog box, enabling interactive control of the waveform display without having to close or move the dialog box to see the result of a change. The oscilloscope has a computer processor compatible with personal computer operating systems, and a separate electronic instrument section. The display has an oscilloscope instrument window within a personal computer operating system window. The display system has two separate memory areas for display data. A first memory area is used for display data from the personal computer operating system. A second memory area is used for the oscilloscope data. A dual-path video chip defaults to the first memory area for display data. A controller for the video chip can be programmed to switch the data path for the video chip to the second memory whenever a particular programmed color is received from the first memory. A rectangle of the particular programmed color is defined in the first memory, thereby defining a rectangular area for oscilloscope data. Pop-up dialog control boxes are implemented by writing in a color that is not the particular programmed color within in the rectangular area in the first memory reserved for oscilloscope data. In particular, a title bar, controls, some text areas, and borders are written in a color that is not the particular programmed color. As a result, within the display area for oscilloscope data, the video chip sends the title bar, controls, text and borders to the display rather than oscilloscope data. The dialog box control elements are visually opaque, obscuring oscilloscope data. Other areas within a dialog box, such as the background area or the space between control elements, may be transparent or translucent. Areas within a dialog box that are to be transparent are written in the first memory in the particular programmed color. For those areas, the video chip sends bits from the oscilloscope (second) memory. For areas that are to be translucent, a checkerboard pattern is written in the first memory, in which every other pixel is some color other than the special programmed color. For example, in a specific embodiment, every other pixel is written as a light gray color in a checkerboard pattern. For those areas, the video chip sends data alternating between the first and second memories. As a result, the dialog box is visually distinct, but oscilloscope data is partially visible in some of the areas of the dialog box.

DETAILED DESCRIPTION OF THE PREFERRED EMBODIMENT OF THE INVENTION

Figure 1:
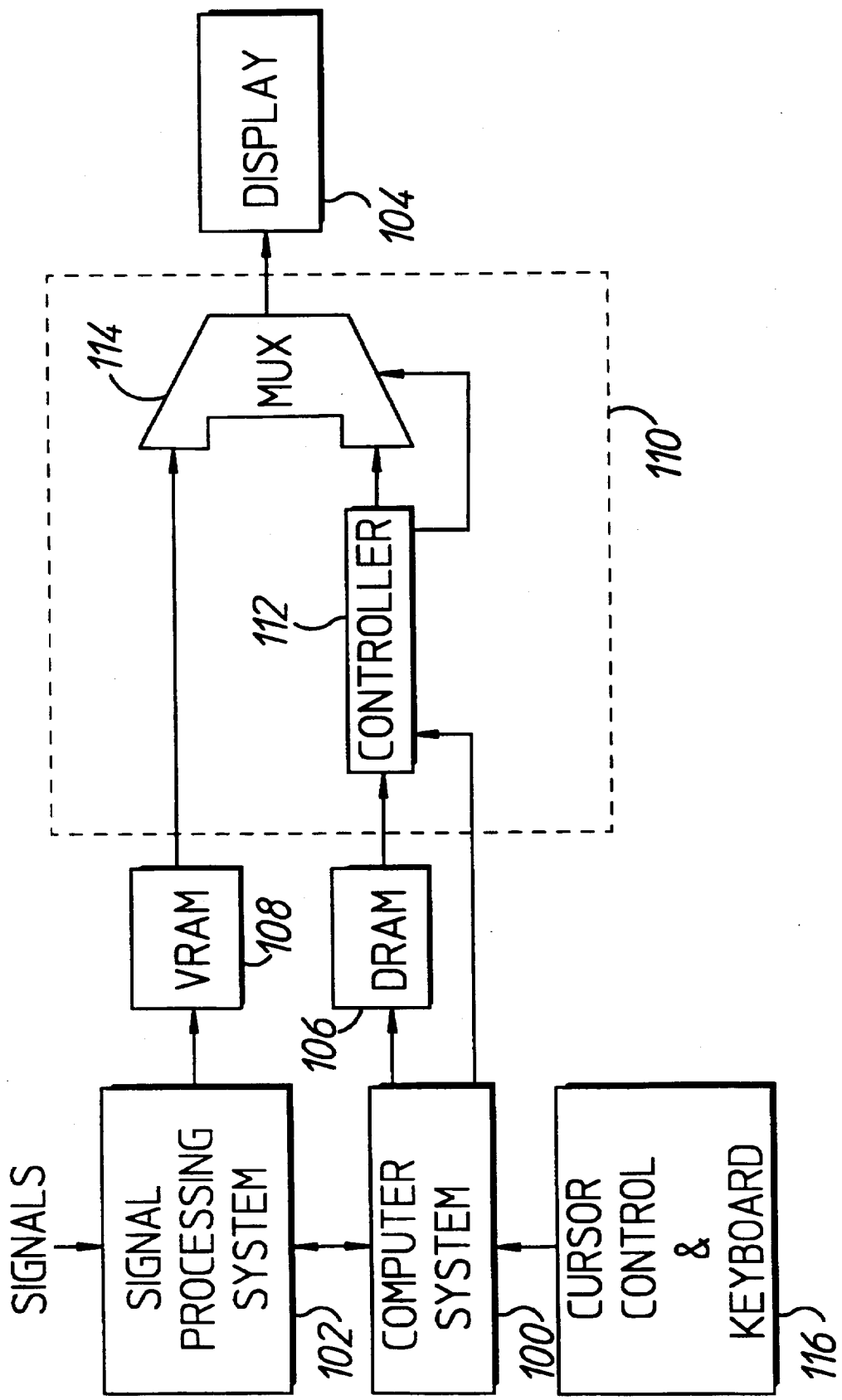
FIG. 1 is a block diagram of a digital oscilloscope including an example embodiment of the invention.

FIG. 1 is a block diagram of a digital oscilloscope. A computer system 100 includes an industry standard microprocessor running an industry standard operating system. The computer system may include peripheral devices such as disk drives and input/output boards. A separate signal processing system 102 includes high frequency electronics for signal acquisition, signal conditioning, and analog-to-digital conversion, all controlled by the computer system 100. The computer system 100 and the signal processing system 102 share a single display 104.

The display 104 is logically or physically divided into an array of picture elements (pixels). A dynamic random access memory (DRAM) 106 contains data specifying a color for each pixel in the display 104. Likewise, a video random access memory (VRAM) 108 contains data specifying a color for each pixel in the display 104. The computer system 100 controls the information in DRAM 106. The signal processing system 102 controls the information in VRAM 108. For each pixel in the display 104, a dual-port video controller chip 110 selects whether the pixel in the display is specified from memory 106 or memory 108. In general, information in VRAM 108 is digitized waveforms being generated by the signal processing system 102 with high rates of change that are much too fast for software processing by the computer system 100 for display of the waveforms.

Video controller chip 110 includes a controller 112 and a multiplexer 114. Controller 112 controls which of two inputs to multiplexer 114 are processed into display signals for sending to the display 104. The controller 112 may be externally programmed, for example, by computer system 100. The controller 112 monitors color data sent from DRAM 106. The controller 112 may be programmed to switch the multiplexer 114 to a different input when a particular programmed color is received from DRAM 106. If the data for a pixel from DRAM 106 specifies a color for the pixel that does not match the particular programmed color, the multiplexer 114 selects the data from DRAM 106 for signals to send to the display for that pixel. If the data for a pixel from DRAM 106 specifies the particular programmed color for a pixel, then the controller 112 switches the multiplexer to VRAM 108 for signals to send to the display for that pixel. A suitable commercially available part for video chip 110 is Chips and Technology SVGA LCD chip F65550. Video chip 110 also provides for an optional X-Y extent control, with X-Y extent control and color control combined by a logical AND function. That is, if X-Y extent control is asserted, the video path is switched only when the particular programmed color is present and the pixel is within a specified rectangular area. In the system illustrated in FIG. 1, computer 100 also asserts the X-Y extent control to eliminate inadvertent path switching outside an area of interest. However, for simplicity of illustration, only color control is discussed for video path switching within the rectangular area of interest.

In an example embodiment, the computer system 100 runs a personal computer operating system that provides a windowing environment for operator interaction and control. A cursor control device (for example, mouse, trackball, or joystick) 116 or an optional keyboard is used to move a cursor on the display 104, and to select items under the cursor. In the example embodiment, controller 112 is programmed to switch when a specific very dark gray (not black) color is received. A rectangular pixel area is defined within DRAM 106 with the programmed dark gray color. Note that the programmed color is not displayed, but instead serves as a data path switch control for multiplexer 114. Therefore, within the programmed color rectangle, display data comes from VRAM 108. When various control functions are needed, an interactive dialog box is drawn within the programmed color rectangle.

Figure 2:
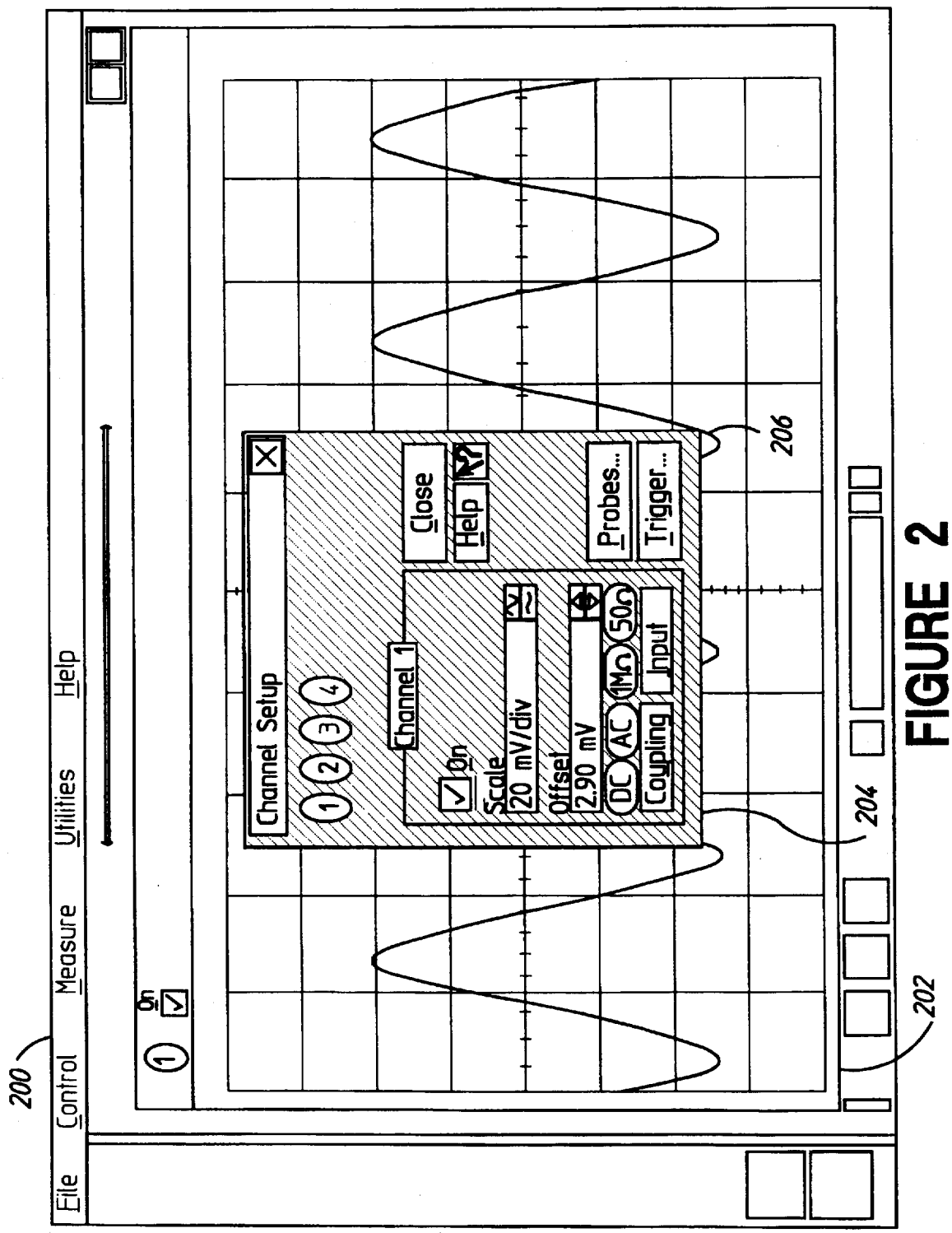
FIG. 2 is a plane view of a display with an opaque dialog box.

FIG. 2 illustrates the resulting display when the entire dialog box is opaque. In FIG. 2, a perimeter area 200 is defined within DRAM 106 by a windows operating system. Rectangular area 202 is drawn in DRAM 106 in the programmed dark gray color (and also programmed as an X-Y extent for controller 112). An interactive dialog box 204 is drawn by the windows operating system, in DRAM 106 within rectangle 202. VRAM 108 (FIG. 1) contains digitized waveform images from the signal processing system 102. Within the rectangle 202, where pixel data with DRAM 106 is the programmed dark gray color, a digitized waveform 206 from VRAM 108 is displayed. Note that the dialog box 204 obscures all of waveform 206 behind the dialog box. In general, waveform 206 may have a feature of interest that is obscured by the dialog box 204, so that dialog box 206 may need to be moved before making any changes in the display parameters. For example, as illustrated, dialog box 204 may be used to change the vertical scale and offset for displaying waveform 206. In general, it is useful to see at least part of the waveform behind the dialog box during interactive control changes.

Figure 3A:
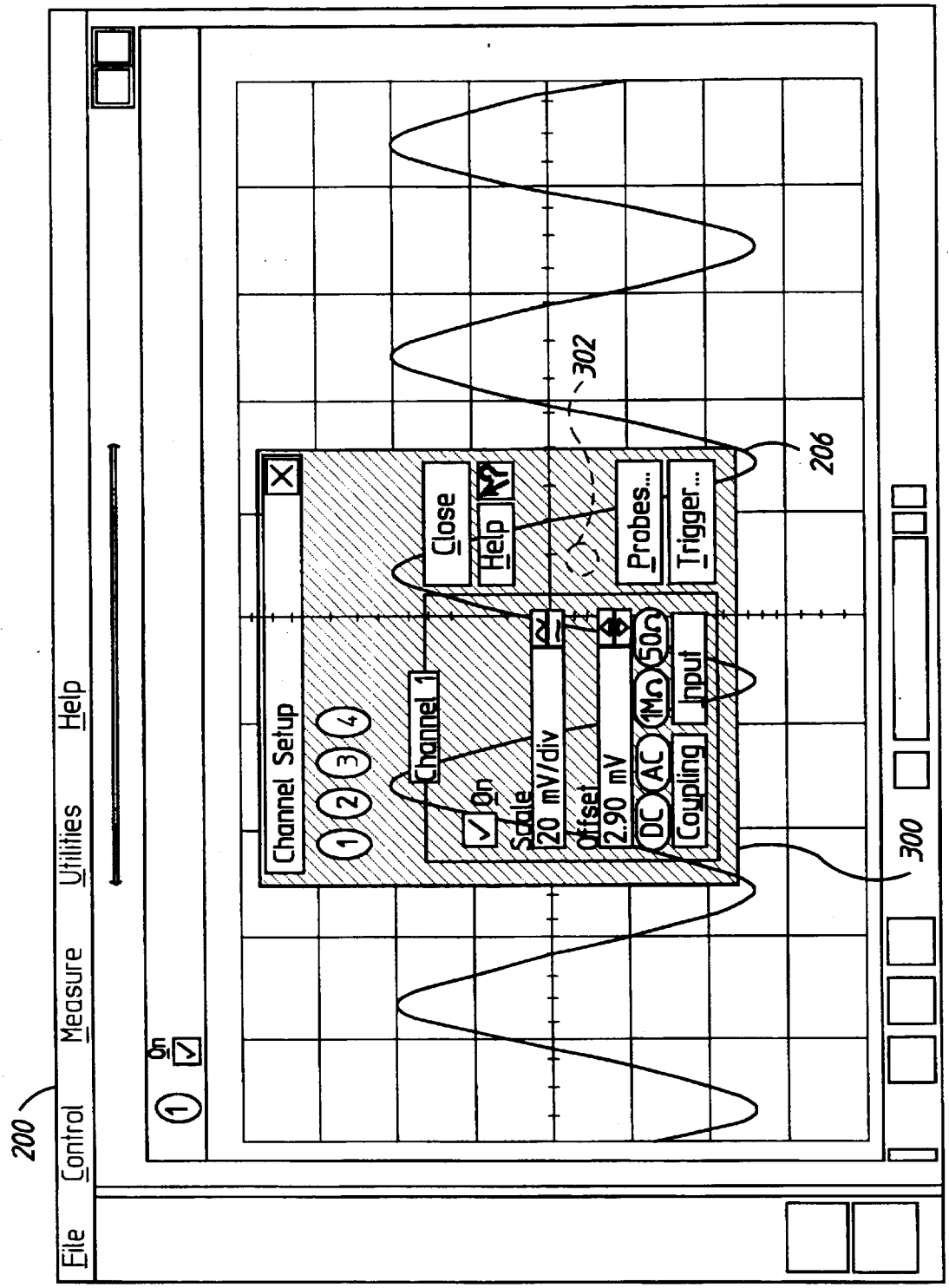
FIG. 3A is a plane view of a display with a translucent dialog box.
Figure 3B:
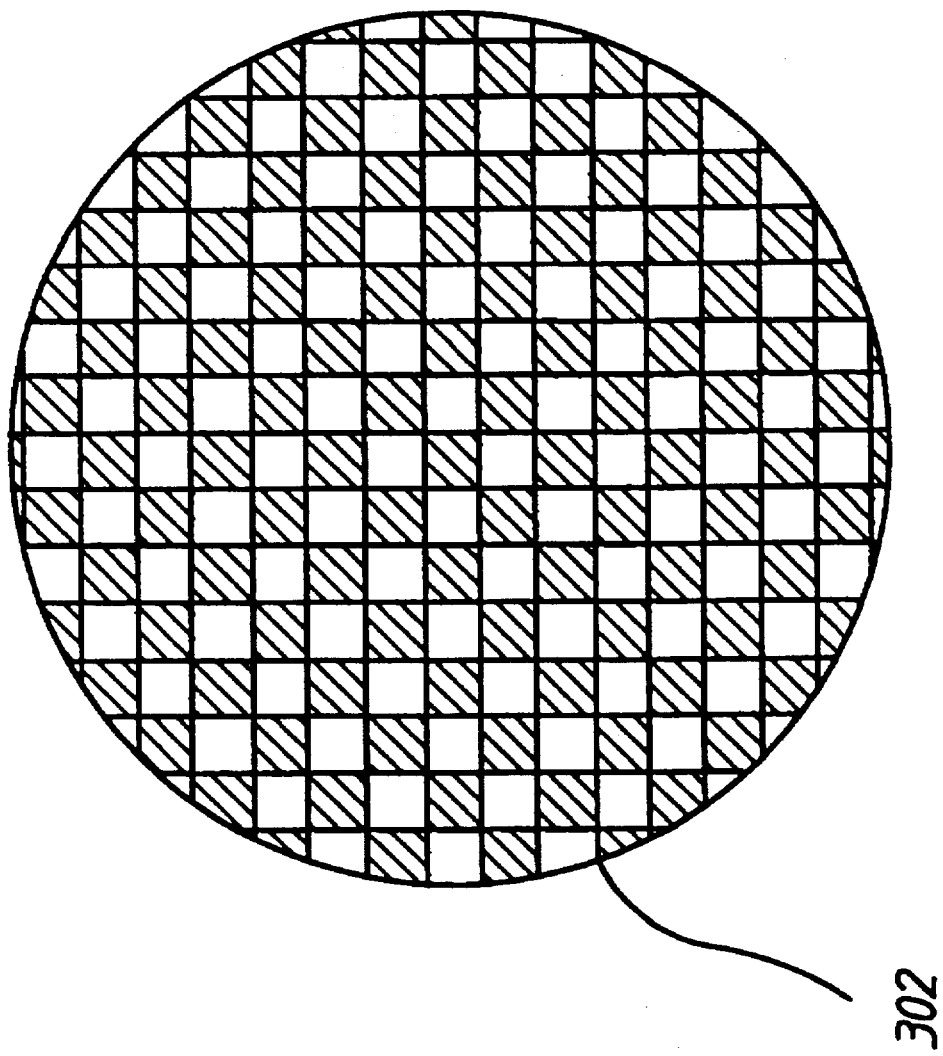
FIG. 3B is an expanded view a potion of the translucent part of the display of FIG. 3A illustrating the pattern used for translucency.

FIG. 3A illustrates a translucent dialog box 300 with waveform 206 partially visible in parts of the dialog box 300. For dialog box 300, a frame 302, information areas 304, and controls 306 are opaque. That is, they are written into DRAM 106 in a color other than the programmed dark gray color. Other areas are written in DRAM 106 with a checkerboard pattern, in which alternate pixels are written in the programmed dark gray color. For example, in even numbered rows, even numbered pixels may be written in the programmed color and in odd numbered rows, odd numbered pixels may be written in the programmed color. The remaining pixels are written in a color other than the programmed dark gray color (for example, a light gray color). As a result, in the checkerboard patterned areas, VRAM 108 controls alternate pixels, providing partial visibility of waveform 206. FIG. 3B is an expanded view of area 308 illustrating the checkerboard pattern.

Figure 4:
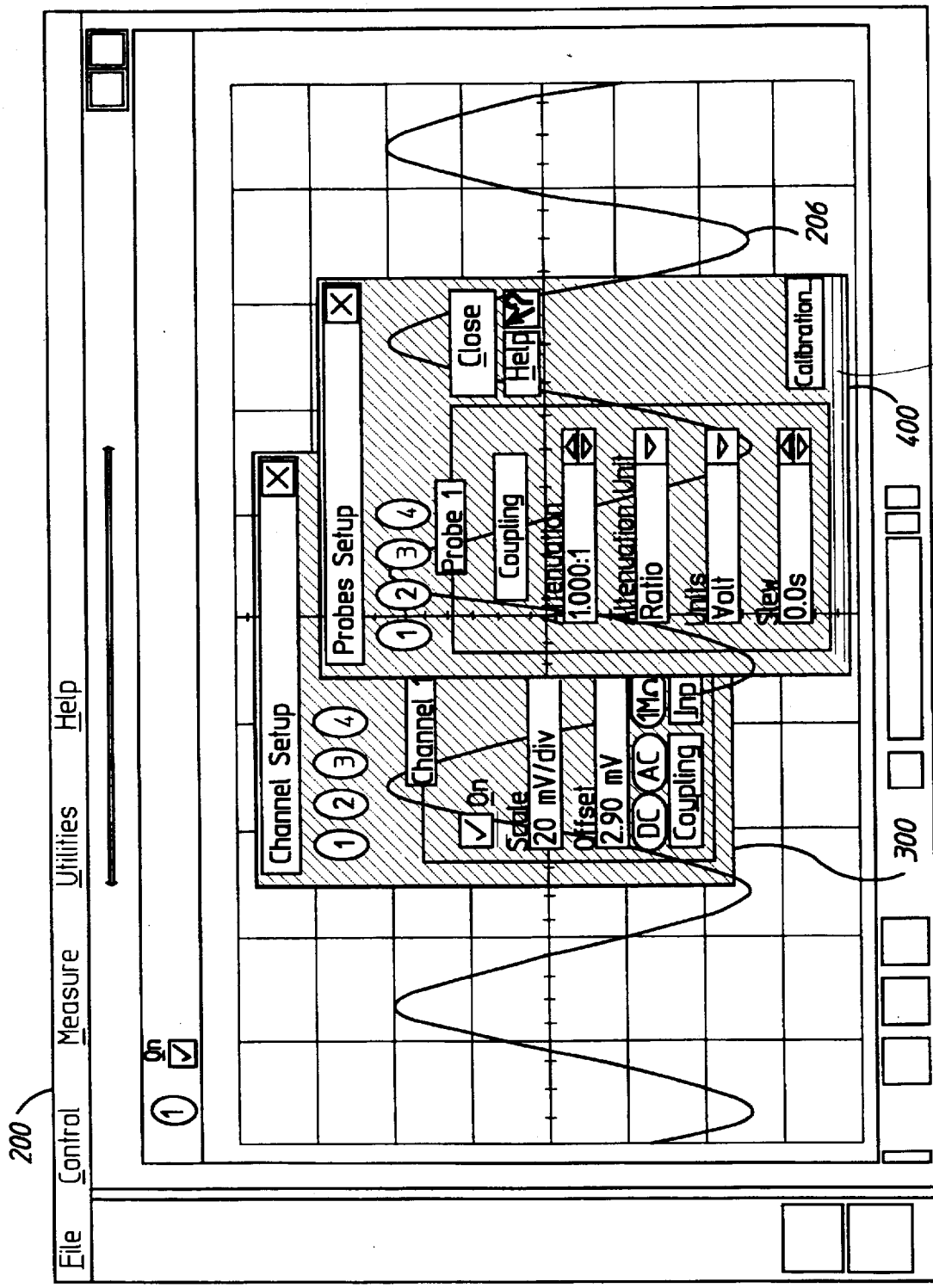
FIG. 4 is a plane view of a display with overlapping translucent dialog boxes.

FIG. 4 illustrates that some dialog boxes may bring up additional dialog boxes. Note that dialog box 400 obscures part of dialog box 300 because dialog box 400 pixels replace dialog box 300 pixels within DRAM 106. However, alternate pixels in some areas of dialog box 400 are in the programmed dark gray checkerboard pattern, so that waveform 206 is still partially visible.

Figure 5:
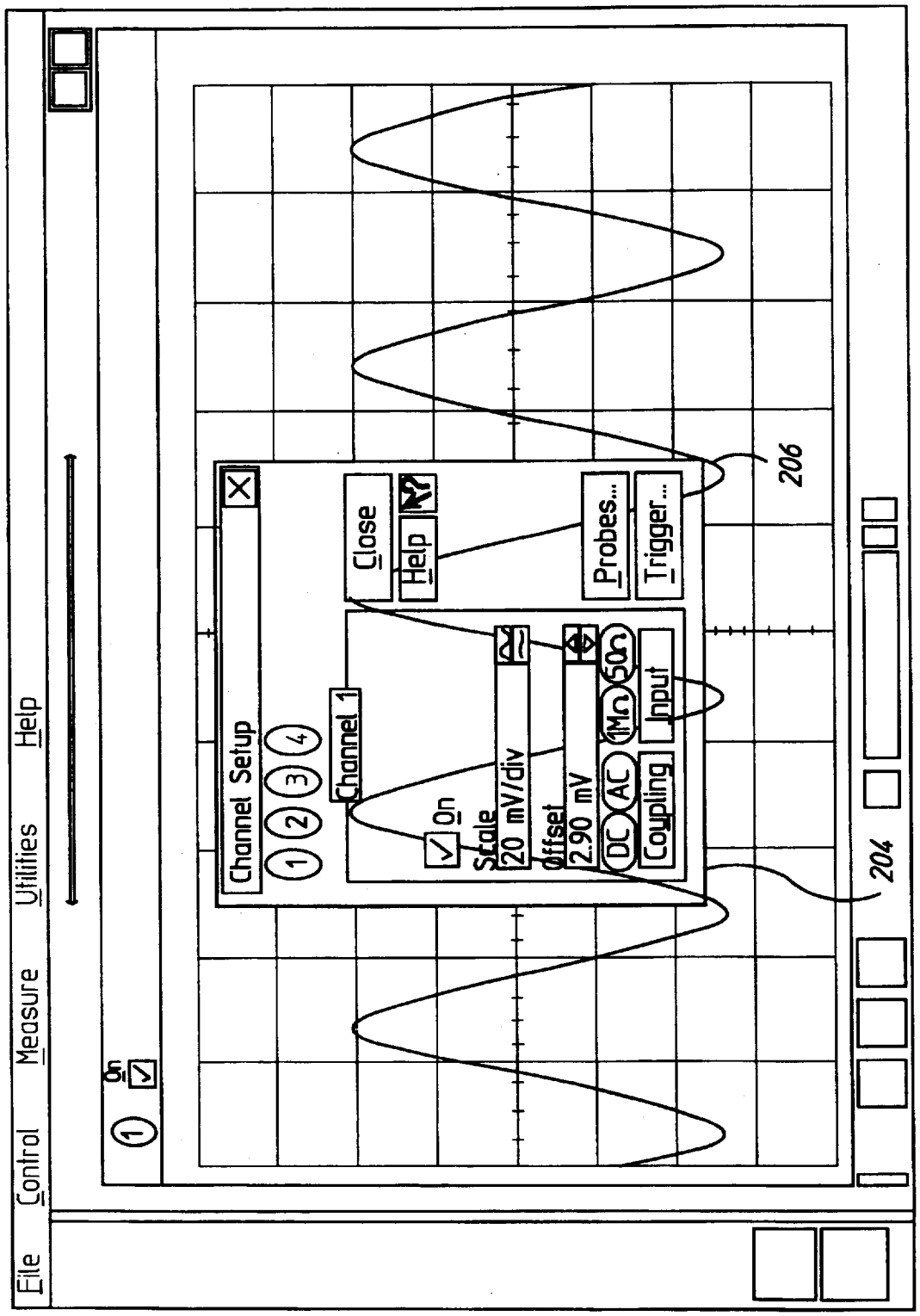
FIG. 5 is a plane view of a display with a transparent dialog box.

In FIG. 5, dialog box 500 has areas that are visually transparent. In the areas between controls and information boxes, instead of writing the checkerboard pattern of FIGS. 3 and 4, the intermediate areas are simply left solid in the programmed dark gray color. Therefore, within those areas, waveform 206 is visible. In a specific example embodiment, dialog boxes may be opaque as in FIG. 2, translucent as in FIGS. 3 and 4 or transparent as in FIG. 5, all under operator control via selection through a menu command. Typically, new operators select a translucent dialog box as in FIGS. 3 and 4 because the background color within the checkerboard areas provides a clearly defined dialog box. Then, with experience, many operators switch to transparent dialog boxes as in FIG. 5 as a personal preference for maximum waveform visibility while dialog boxes are being displayed.

A digital oscilloscope has been presented as a specific example. However, translucent or transparent windows have general application in any environment where interactive control is required. Other applications of interest include synthesizers and logic analyzers, computer graphics, interactive games, process control systems, and cockpit displays.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A display system comprising:

a first memory defining a first graphical image, the first graphical image comprising a matrix of picture elements;

a second memory defining a second graphical image, the second graphical image comprising a matrix of picture elements; a display;

a display controller receiving data from the first and second memories and controlling a display image on the display; and the display image containing opaque areas and translucent areas, wherein within the opaque areas only the first graphical image is visible and within the translucent areas alternating picture elements are defined only by the first memory and remaining picture elements are defined only by the second memory.

2. A display system comprising:

a first memory having numerical values for first pixels defining a first image, wherein at least some of the numerical values for the first image have a particular numerical value and at least some of the numerical values for the first image area do not have the particular numerical value;

a second memory having numerical values for second pixels defining a second image, wherein for every second pixel there is a corresponding first pixel;

a display;

a display controller receiving data from the first and second memories and controlling an image on the display, the display controller using one of the second pixels for the display when the corresponding first pixel has the particular numerical value and otherwise using the corresponding first pixel; and wherein for the image on the display, at least part of the first image is displayed within a first particular area, and within the first particular area at least part of the second image is displayed in a second particular area, and within the second particular area at least part of the first image is displayed.

3. The display system of claim 2 further comprising:

within the second particular area there are third areas containing only first pixels and the third areas are completely surrounded by second pixels, thereby making the second image fully visible around the third areas.

4. The display system of claim 2 further comprising:

within the second particular area, there are third areas containing only first pixels and the third areas are surrounded by a pattern of second pixels, thereby making the second image partially visible around the third areas.

5. The display system of claim 4 further comprising:

the pattern of second pixels comprising alternating pixels being second pixels and remaining pixels being first pixels.

6. The display system of claim 2 further comprising:

data in the second memory comprising digitized signal data in an electronic instrument.

7. The display system of claim 6, the electronic instrument being an oscilloscope.

* * * * *